(12) United States Patent
Ranta-Aho et al.

(10) Patent No.: US 8,897,276 B2
(45) Date of Patent: Nov. 25, 2014

(54) COLLISION DETECTION FOR RANDOM ACCESS PROCEDURE

(75) Inventors: Karri Ranta-Aho, Espoo (FI); Harri Holma, Helsinki (FI); Jeroen Wigard, Klarup (DK); Antti Toskala, Espoo (FI); Juho Pirskanen, Tampere (FI)

(73) Assignee: Nokia Corporation, Espoo (FI)

( * ) Notice: Subject to any disclaimer, the term of this patent is extended or adjusted under 35 U.S.C. 154(b) by 1142 days.

(21) Appl. No.: 12/019,891

(22) Filed: Jan. 25, 2008

(65) Prior Publication Data

US 2008/0192766 A1 Aug. 14, 2008

Related U.S. Application Data

(60) Provisional application No. 60/894,328, filed on Jan. 25, 2007.

(51) Int. Cl.
*H04W 4/00* (2009.01)
*H04W 74/00* (2009.01)
*H04W 74/08* (2009.01)

(52) U.S. Cl.
CPC ........ *H04W 74/004* (2013.01); *H04W 74/0833* (2013.01)
USPC ....................................................... 370/338

(58) Field of Classification Search
CPC ................................................ H04W 74/0858
See application file for complete search history.

(56) References Cited

U.S. PATENT DOCUMENTS

| | | | |
|---|---|---|---|
| 5,796,738 A * | 8/1998 | Scott et al. ..................... | 370/401 |
| 5,960,445 A | 9/1999 | Tamori et al. | |
| 5,966,636 A * | 10/1999 | Corrigan et al. .............. | 725/116 |
| 6,098,126 A * | 8/2000 | Batson et al. ................... | 710/58 |
| 6,272,117 B1 * | 8/2001 | Choi et al. ..................... | 370/330 |
| 6,282,644 B1 | 8/2001 | Ko | |
| 6,574,267 B1 | 6/2003 | Kanterakis et al. | |
| 6,611,514 B1 | 8/2003 | Moulsley | |
| 6,643,318 B1 | 11/2003 | Parsa et al. | |
| 6,738,366 B1 * | 5/2004 | Etemad et al. ................ | 370/337 |
| 7,013,146 B2 | 3/2006 | Wang et al. | |

(Continued)

FOREIGN PATENT DOCUMENTS

| | | |
|---|---|---|
| EP | 1400049 | 3/2004 |
| EP | 1643690 A1 | 4/2006 |

(Continued)

OTHER PUBLICATIONS

U.S. Appl. No. 60/848,106, filed Sep. 29, 2006, Wigard, et al.

(Continued)

*Primary Examiner* — Chirag Shah
*Assistant Examiner* — Amar Persaud
(74) *Attorney, Agent, or Firm* — Harrington & Smith

(57) ABSTRACT

A method, an apparatus and a communication system for collision detection for a random access procedure for an uplink data channel. In one embodiment, the apparatus includes a module configured to transmit a data transmission on the uplink data channel, and an uplink scheduling and signal generating module configured to select random access parameters for a random access procedure and schedule the data transmission using the random access parameters for the random access procedure. The uplink scheduling and signal generating module is also configured to interrupt the data transmission after a predetermined time interval if the apparatus does not receive a permission signal from a network element during the predetermined time interval.

35 Claims, 3 Drawing Sheets

(56) References Cited

U.S. PATENT DOCUMENTS

| | | | |
|---|---|---|---|
| 7,136,994 B2 | 11/2006 | Zimmer et al. | |
| 7,293,165 B1 | 11/2007 | Tobias | |
| 2003/0223452 A1 | 12/2003 | Toskala et al. | 370/442 |
| 2004/0110521 A1 | 6/2004 | Soldani et al. | |
| 2004/0136403 A1 | 7/2004 | Kekki | 370/477 |
| 2004/0264497 A1* | 12/2004 | Wang et al. | 370/465 |
| 2005/0047344 A1* | 3/2005 | Seol | 370/235 |
| 2005/0122933 A1* | 6/2005 | Kwon et al. | 370/328 |
| 2005/0157678 A1 | 7/2005 | Mantha et al. | 370/329 |
| 2005/0243763 A1 | 11/2005 | Toskala et al. | 370/328 |
| 2005/0271025 A1 | 12/2005 | Guethaus et al. | 370/342 |
| 2006/0146762 A1 | 7/2006 | Kuroda et al. | 370/335 |
| 2006/0167919 A1 | 7/2006 | Hsieh | |
| 2006/0168189 A1 | 7/2006 | Huang | |
| 2006/0183429 A1 | 8/2006 | Anderson | 455/67.13 |
| 2006/0209692 A1 | 9/2006 | Usuda et al. | 370/232 |
| 2006/0268717 A1 | 11/2006 | Kanterakis | 370/235 |
| 2006/0281417 A1 | 12/2006 | Umesh et al. | |
| 2007/0064665 A1* | 3/2007 | Zhang et al. | 370/343 |
| 2007/0094426 A1 | 4/2007 | Chiang et al. | |
| 2007/0104177 A1* | 5/2007 | Hwang et al. | 370/348 |
| 2007/0147326 A1* | 6/2007 | Chen | 370/338 |
| 2007/0186086 A1 | 8/2007 | Lambert et al. | |
| 2007/0189237 A1 | 8/2007 | Jaatinen et al. | 370/335 |
| 2007/0189365 A1* | 8/2007 | Olsson et al. | 375/148 |
| 2010/0182974 A1 | 7/2010 | Barraclough et al. | 370/329 |
| 2012/0140715 A1 | 6/2012 | Cave et al. | 370/329 |

FOREIGN PATENT DOCUMENTS

| | | |
|---|---|---|
| EP | 1743503 | 1/2007 |
| WO | WO 00/21320 | 4/2000 |
| WO | 03003643 A1 | 1/2003 |
| WO | WO 03/100988 A2 | 12/2003 |
| WO | 2005109941 A1 | 11/2005 |
| WO | 2008053321 A2 | 5/2008 |
| WO | 2008156315 A2 | 12/2008 |
| WO | 2009020423 A1 | 2/2009 |

OTHER PUBLICATIONS

"3rd Generation Partnership Project; Technical Specification Group Radio Access Network; Physical Channels and Mapping of Transport Channels onto Physical Channels (FDD): Release 4," 3GPP TS 25.211, V4.0.0, Mar. 2001, 3GPP Organizational Partners, Valbonne, France.

Etemad, K., "Enhanced Random Access and Reservation Scheme in CDMA2000," IEEE Personal Communications, Apr. 2001, pp. 30-36, vol. 8, Issue 2, IEEE, Los Alamitos, CA.

R2-061189, 3GPP TSG-RAN WG2 Meeting #53, "Further discussion on delay enhancements in Rel7", Nokia, May 2006, 5 pgs.

R1-074300, 3GPP TSG-RAN WG2 Meeting #59bis, Shanghai, China, Oct. 8-12, 2007, Nokia, "Enhanced CELL_FACH State with E-DCH", (2 pages).

R2-074622, 3GPP TSG-RAN WG2 Meeting #60, Jeju, Korea, Nov. 5-9, 2007, Nokia, "On Collision Resolution with Enhanced UL Cell_Fach State", (3 pages).

"Adaptive Channel Switching for Admission Control with QoS and Priority in WCDMA Uplink", Ding Cao et al., IEEE 2004, pp. 69-76.

3GPP TS 25.214 V.7.5.0, "$3^{rd}$ Generation Partnership Project; Technical Specification Group Radio Access Network; Physical layer procedures (FDD) (Release 7)", May 2007, 84 pgs.

3GPP TS 25.308 V7.3.0, "$3^{rd}$ Generation Partnership Project; Technical Specification Group Radio Access Network; High Speed Downlink Packet Access (HSDPA); Overall description; Stage 2 (Release 7)", Jun. 2007, 47 pgs.

3GPP TS 25.211 V4.6.0, "$3^{rd}$ Generation Partnership Project; Technical Specification Group Radio Access Network; Physical channels and mapping of transport channels onto physical channels (FDD) (Release 4)", Sep. 2002, 46 pgs.

3GPP TS 25.212 V4.6.0, "$3^{rd}$ Generation Partnership Project; Technical Specification Group Radio Access Network; Multiplexing and channel coding (FDD) (Release 4)", Sep. 2002, 62 pgs.

3G TS 25.213 V4.4.0, "$3^{rd}$ Generation Partnership Project; Technical Specification Group Radio Access Network; Spreading and modulation (FDD) (Release 4)", Dec. 2003, 26 pgs.

3GPP TS 25.214 V4.6.0, "$3^{rd}$ Generation Partnership Project; Technical Specification Group Radio Access Network; Physical layer procedures (FDD) (Release 4)", Mar. 2003, 53 pgs.

3GPP TS 25.215 V4.8.0, "$3^{rd}$ Generation Partnership Project; Technical Specification Group Radio Access Network; Physical layer—Measurements (FDD) (Release 4)", Mar. 2005, 18 pgs.

3GPP TS 25.309 V6.6.0 (Mar. 2006); "3rd Generation Partnership Project; Technical Specification Group Radio Access Network; FDD Enhanced Uplink; Overall description: Stage 2 (Release 6)"; Mar. 2006; whole document (34 pages).

3GPP TS 25.321 V6.10.0 (Sep. 2006); "3rd Generation Partnership Project; Technical Specification Group Radio Access Network; Medium Access Control (MAC) protocol specification (Release 6)"; Sep. 2006; whole document (91 pages).

Ghosh, A. et al.; "Overview of Enhanced Uplink for 3GPP W-CDMA"; 2004; whole document (5 pages); IEEE.

Reig. J. et al.; "Random Access Channel (RACH) Parameters Optimization in WCDMA Systems"; 2004; whole document (5 pages); IEEE.

Itri; "Layer 1 Procedure of Non-synchronized Random Access in E-UTRA"; 3GPP TSG RAN WG1 Meeting #46bis: R1-062501; Oct. 9-13, 2006; Seoul, Korea: whole document (5 pages).

"Golden Bridge Technology, Intellectual Property"; Retrieved on Apr. 18, 2012; URL: http://www.gbtwireless.com/IntellectualProp.htm; whole document (2 pages).

\* cited by examiner

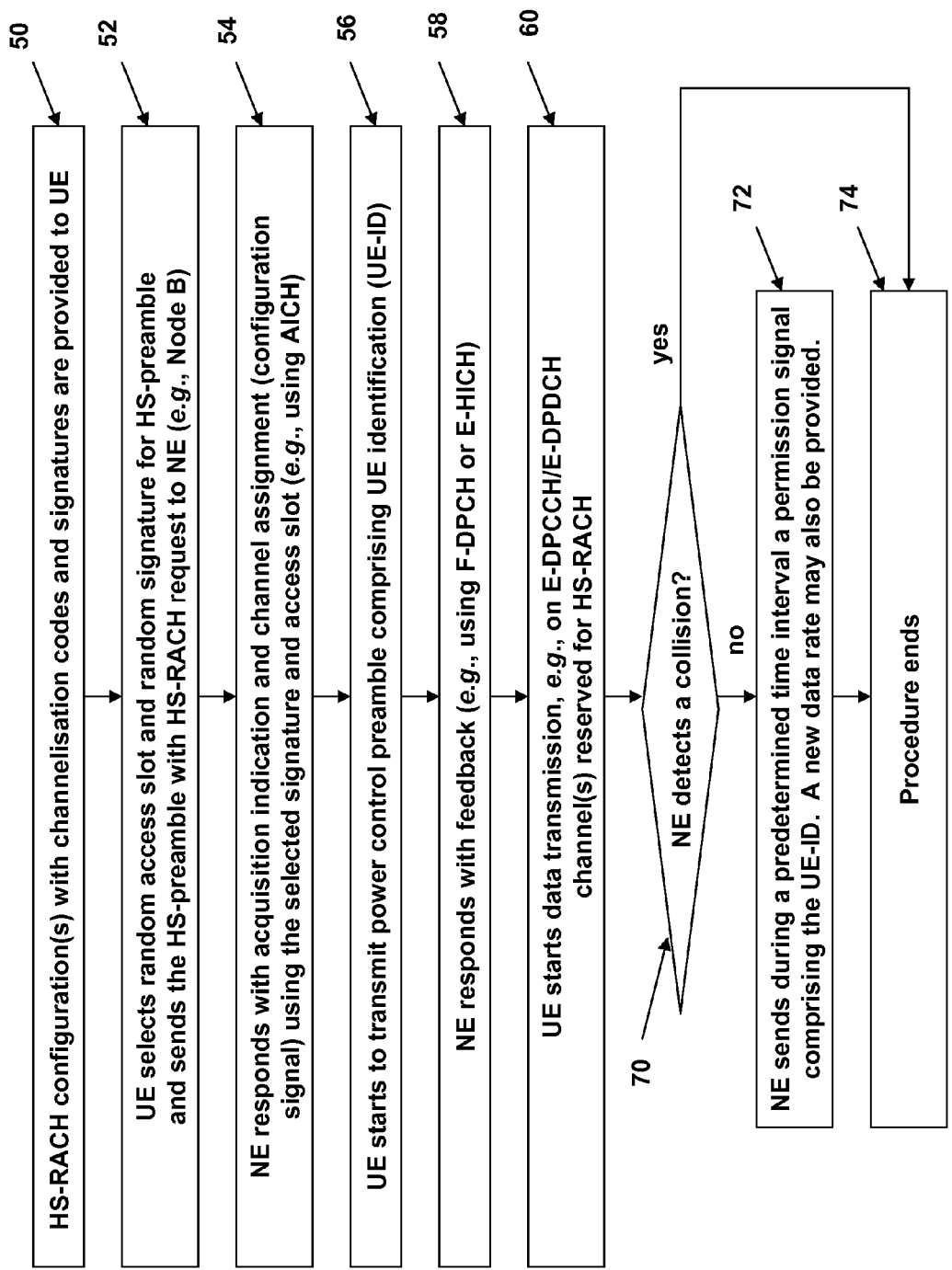

COLLISION DETECTION FOR RANDOM ACCESS PROCEDURE

This application claims the benefit of U.S. Provisional Application No. 60/897,328 entitled "Collision Detection for Random Access Procedure," filed on Jan. 25, 2007, which is incorporated herein by reference.

TECHNICAL FIELD

The present invention is directed, in general, to communication systems such as wireless/mobile communication systems and, more particularly, to a system and method for collision detection for a random access procedure for an uplink data channel such as an enhanced dedicated channel.

BACKGROUND

Universal Mobile Telecommunications System (UMTS) is a wireless communication system that is known in the art and is designed to provide higher data rates and enhanced service to subscribers. UMTS is standardized by the Third Generation Partnership Project (3GPP), including the specifications relating to the Evolved Universal Terrestrial Radio Access (Evolved UTRA) and Universal Terrestrial Radio Access Network (UTRAN). The UMTS network includes user equipment (UE, also referred to as a wireless communication device), UMTS Terrestrial Radio Access Network (UTRAN), and Core Network (CN). A UE is interfaced to cellular network elements of the UTRAN over a radio Uu interface, while the UTRAN interfaces to the core network over a wired Iu interface. The CN is generally coupled to the external network, which may include the Internet, a Public Land Mobile Network (PLMN), a Public Switched Telephone Network (PSTN), an Integrated Services Digital Network (ISDN), etc., which can exchange information to and from a UE.

The UTRAN includes multiple Radio Network Subsystems (RNSs), each of which contains at least one Radio Network Controller (RNC). However, it should be noted that the RNC may or may not be present as an actual separate network element as the logical functionality can be implemented inside a Node B. Furthermore, it should be noted that in the Long Term Evolution (LTE) of UTRAN (E-UTRAN) the RNC may not be present, but logical functions are implemented in an evolved Node B (E-Node B). The LTE may include a centralized or decentralized entity for control information. In operation, each RNC may be connected to one or multiple Node Bs, which are the network elements of the UMTS counterparts to Global System for Mobile Communications (GSM) base stations. Each Node B may be in radio contact with multiple UEs via the radio Uu interface.

The Third Generation Partnership Project Long Term Evolution (3GPP LTE) is the name generally used to refer to an ongoing effort across the industry to improve the UMTS for mobile communication to cope with continuing new requirements and the growing base of users. The goals of this broadly based project include improving communication efficiency, lowering costs, improving services, making use of new spectrum opportunities, and achieving better integration with other open standards. The 3GPP LTE project is not by itself a standard-generating effort, but will result in new recommendations for standards for the UMTS.

Communication in a cellular wireless communication system is typically established from end to end through a network. In its most simplistic terms, unlike hard-wired "landline" communications, a wireless communication device such as a UE establishes a connection to a network to carry communication data. Accordingly, a procedure is carried out between the UE and the network by means of a network element (e.g., a Node B) to establish connection. The operation, features, and advantages of wireless communication devices are well known.

An uplink access channel, broadly referred to herein as a Random Access Channel (RACH), is one typically utilized by a UE for initial access signaling to a network in instances when no dedicated or shared physical channel connection is currently established. Typically such signaling between the UE and the network on the RACH and its downlink counterpart channel is used to establish dedicated or shared channel connections mentioned above. For example, the RACH is used for initial cell access after a UE powers on. Furthermore, the RACH can be used to perform other signaling functions and data transfer functions such as a location update after the UE moves from one location to another, for initiating a call, or for user data transmission. The RACH capture procedure specified by the 3GPP requires a UE to transmit a series of access preambles, each with increasing transmit power for each access preamble attempt. Each of the access attempts is separated by an appropriate waiting time of sufficient duration to allow detection of an acknowledgment indication (AI) signal from the receiving Node B.

U.S. Provisional Patent Application No. 60/848,106 entitled "Apparatus, Method and Computer Product Providing Usage of E-DCH as RACH Shared Channel," by J. Wigard, H. Holma, and K. Ranta-aho, filed on Sep. 29, 2006, which is incorporated herein by reference, describes using Enhanced Dedicated Channels (E-DCHs) in the random access procedure of the Universal Mobile Telecommunications System (UMTS) that allows for higher data rates and longer transmission times for a UE than the current RACH procedure. There is no collision detection mechanism in this type of RACH application. For example, as the maximum transmission time of a RACH message is 20 milliseconds (ms), and if a collision occurs (two transmitters use the same access slot and signature at the same time), the packets are lost. Nonetheless, the system automatically recovers from the collision after the transmission ends, retransmission mechanisms, higher in the protocol stack, handle a retransmission attempt in due time.

Considering that with the E-DCH random access procedure, the message length may be much longer and data rates much higher than with the current RACH procedure, the likelihood of collision at a network element is substantially increased. Thus, a system and method capable of detecting and solving the collision situation in the network, particularly in view of the E-DCH random access procedure, would be a beneficial wireless communication system enhancement.

SUMMARY OF THE INVENTION

These and other problems are generally solved or circumvented, and technical advantages are generally achieved, by embodiments of the present invention, which include a method, an apparatus and a communication system for collision detection for a random access procedure for an uplink data channel. In one embodiment, the apparatus includes a module configured to transmit a data transmission on the uplink data channel, and an uplink scheduling and signal generating module configured to select random access parameters for a random access procedure and schedule the data transmission using the random access parameters for the random access procedure. The uplink scheduling and signal generating module is also configured to interrupt the data transmission after a predetermined time interval if the apparatus does not receive a permission signal from a network element during the predetermined time interval.

In another aspect, a method includes selecting random access parameters for a random access procedure, and transmitting a data transmission on an uplink data channel by a communication device to a network element using the random access parameters for the random access procedure. The method also includes interrupting the data transmission after a predetermined time interval if the communication device does not receive a permission signal from the network element during the predetermined time interval.

In another aspect, a communication system includes a network element and user equipment. The network element includes a scheduling and signal generating module configured to provide a configuration signal and a transmitter configured to transmit the configuration signal. The user equipment includes a module configured to transmit a data transmission on an uplink data channel to the network element, and an uplink scheduling and signal generating module configured to select random access parameters for a random access procedure in accordance with the configuration signal and schedule the data transmission using the random access parameters for the random access procedure. The uplink scheduling and signal generating module is also configured to interrupt the data transmission after a predetermined time interval if the user equipment does not receive a permission signal from the network element during the predetermined time interval.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which:

FIG. 3 illustrates a flow chart demonstrating collision detection for a random access procedure for an uplink data channel in a wireless communication system constructed according to an embodiment.

DETAILED DESCRIPTION OF ILLUSTRATIVE EMBODIMENTS

Figure 1:
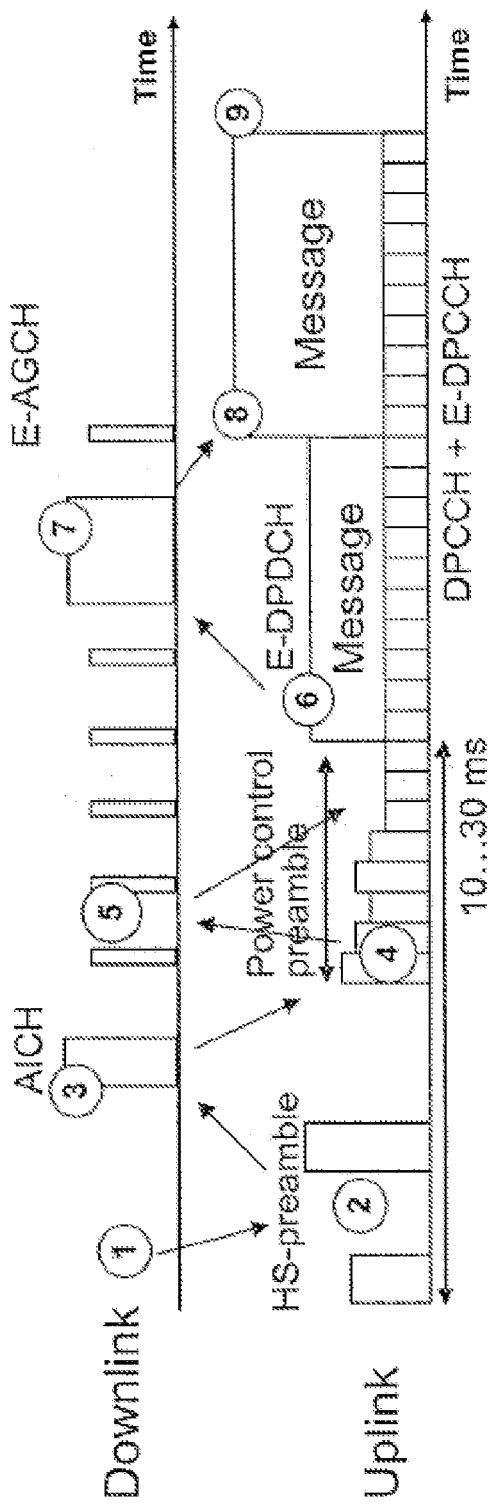
FIG. 1 illustrates a conceptual timing relationship diagram for downlink and uplink signals demonstrating collision detection for a random access procedure for an uplink data channel constructed according to an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context for a communication device such as a wireless communication device (e.g., user equipment) for communicating with a network element (e.g., a Node B) in a communication system such as a wireless/mobile communication system utilizing an uplink data channel (e.g., an Enhanced Dedicated Channel (E-DCH) such as an Enhanced Dedicated Physical Control Channel (E-DPCCH) and/or an Enhanced Dedicated Physical Data Channel (E-DPDCH)). As an example, the present invention can be applied to 3GPP Wideband Code-Division Multiple Access (WCDMA) radio access and for use with release 6 High-Speed Uplink Packet Access (HSUPA) physical channels as shared transport channels. In general, embodiments of the invention may be applied to any form of communication network such as a cellular wireless communication network.

In an embodiment, the UE can transmit a User Equipment Identification (UE-ID) for a random access procedure in the uplink and, after starting a data transmission in the uplink using random access parameters for the random access procedure, the network element (e.g., a Node B) may provide a permission signal (e.g., a permission signal including the UE-ID) to the UE in the downlink. The permission signal can be sent on an E-DCH Absolute Grant Channel (E-AGCH), an E-DCH Relative Grant Channel (E-RGCH), an E-DCH Hybrid Automatic Repeat Request Acknowledgement Indicator Channel (E-HICH), or a High-Speed Shared Control Channel (HS-SCCH). Moreover, the data transmission can be interrupted after a predetermined time interval if the network element detects a collision and does not provide the permission signal including the UE-ID to the user equipment during the predetermined time interval. In other words, if the UE does not receive the permission signal with the UE-ID from the Node B, it will consider the random access procedure as having failed and will stop transmitting. However, if the collision is not detected by the network element during the predetermined time interval and the permission signal is provided to the UE by the network element during the predetermined time interval, then the data transmission also continues after the predetermined time interval.

Additionally, the data transmission can be interrupted during the predetermined time interval if the network element detects a collision and does not provide an updated permission signal to the user equipment therein. It is noted that the predetermined time interval can be preset in the system (e.g., by a specification/standard). However, it may be beneficial to have the predetermined time interval modifiable dynamically by the network. For instance, if the number of users changes or if a higher priority user accesses the system, one may reduce the predetermined time interval for the existing users. The predetermined time interval can even be made user-class dependent.

Furthermore, the UE can send the UE-ID in an Enhanced Dedicated Physical Control Channel (E-DPCCH), an Enhanced Dedicated Physical Data Channel (E-DPDCH), or a Media Access Control (MAC) header on an enhanced dedicated physical data channel to the Node B. The UE-ID can be used to generate a UE-specific Cyclic Redundancy Check (CRC) with the UE-ID masked on the CRC to generate a UE-specific CRC that the UE knowing the UE-ID is able to recognize, wherein the UE-specific CRC can be included in the permission signal on the downlink channel such as an E-AGCH.

The random access parameters for starting the RACH data transmission described herein can be selected using the following procedure. The procedure may include providing one or more configurations for the random access procedure to the UE by the network element using, for instance, a Broadcast Channel (BCH). The UE may select a random access slot (or RACH access slot) and a random signature for the random access procedure using the one or more configurations, and sending a preamble signal including the random access slot and the random signature by the UE to the network element. The procedure may also include providing a configuration signal including an acquisition indication and a channel assignment for the uplink data channel (e.g., the E-DCH) using the random access slot and the random signature by the network element to the UE on, for instance, an Acquisition Indicator Channel (AICH).

If two UEs transmit using the same random RACH access slot and signature, the UEs will consider the corresponding AICH indication to be meant for the respective UEs even if only one of the transmitters was actually heard by the Node B. This leads to both UEs trying to transmit with the same configuration at the same time. Consequently, the Node B cannot receive both transmissions correctly and, therefore, does not receive the UE-ID from both UEs and cannot send the permission signal including the UE-ID back to either of the UEs, thereby resolving the data collision issue.

Alternatively, according to a further embodiment, a Node B could detect that a collision is taking place (e.g., from the uplink transmission (interference) situation) and can send a stop signal (e.g., on the E-AGCH), which may be received by all UEs currently transmitting on, for instance, the High-Speed Random Access Channel (HS-RACH). This stop signal does not need to include the user equipment identification. In other words, this stop command (signal) could be heard by the transmitting UEs involved in the collision detection procedure and interpreted as an indication of the collision. Thus, the UEs can stop the data transmission after receiving this stop signal at any time during the data transmission using the RACH procedure, described herein.

Turning now to FIG. 1, illustrated is a conceptual timing relationship diagram for downlink and uplink signals demonstrating collision detection for a random access procedure for an uplink data channel constructed according to an embodiment. At point 1, the UE receives the HS-RACH configuration(s) on the BCH channel from the network (e.g., from the network element) similarly to a conventional RACH mechanism. In addition, the configuration(s) including channelisation codes and signatures (e.g., the UL scrambling code/Fractional Dedicated Physical Channel (F-DPCH)/E-HICH/E-RGCH/E-AGCH codes and the E-RGCH/E-HICH signatures) can be broadcast to the UE. There may be multiple sets from which one set can be assigned for the UE's use during the HS-RACH procedure. In particular, a UE can select a random access slot and a random signature for the HS-preamble from the sets the network broadcasts to the cell. These signatures and/or access slots are allocated for HS-RACH usage and thus can be used to separate the Rel'99 RACH procedure, which is incorporated herein by reference, from the HS-RACH procedure, described herein.

The REL'99 RACH is the conventional RACH (i.e., a random access mechanism defined in the Release 1999 version of the standard) wherein after the Physical Random Access Channel (PRACH) preamble/AICH procedure, a single 10 or 20 millisecond (ms) long message is sent. There are 16 signatures that can be transmitted in parallel and 15 access slots that are divided in time and recur every 20 ms. The BCH channel informs the UEs which access slots and/or signatures are assigned for Rel'99 RACH and for the HS-RACH and, when starting a HS-RACH procedure, will pick a random access-slot/signature combination that corresponds to a HS-RACH access.

At point 2, the UE sends the selected signature on a selected access slot as an HS-preamble using the RACH preamble procedure as it is done with a conventional RACH. The network (e.g., the network element) detects that the HS-RACH procedure is requested from the used access slot and/or the preamble signature and, at point 3, the network responds with an acquisition message including an acquisition indication (e.g., on the AICH) that corresponds to the used signature and the access slot. The HS-RACH procedure can also use additional bits for channel assignment in the AICH channel to point to one of the E-DCH/F-DPCH/E-HICH/E-RGCH/E-AGCH configurations for the UE to use.

At point 4, the UE starts transmitting a power control preamble of a predefined length allowing the uplink power control to settle before actual data transmission starts using a preconfigured scrambling code and, at point 5, the Node B transmits corresponding Transmit Power Control (TPC) bits in the downlink using a corresponding F-DPCH channelisation code for controlling the UEs transmitted power. The power control preamble may carry the specific UE-ID or signature that is either randomly selected or derived from the International Mobile Subscriber Identity (UE IMSI), the International Mobile Equipment Identity (IMEI), or Radio Network Temporary Identity (RNTI). Optionally, the UE-ID or signature may be included in the first Packet Data Unit (PDU) or first PDUs of the uplink data transmission initiated. The power control preamble may be conventional or gated transmission of E-DPCCH frames. Thus, the UE-ID may be carried in a MAC header in the first PDU or first PDUs of the data transmission on the E-DPDCH.

At point 6, after the preamble transmission ends, the UE starts transmitting the (data) message on the E-DCH channel (e.g., E-DPCCH/E-DPDCH) using the configuration received in the broadcast message. Again, the UE-ID or signature may be included in the MAC header of the transmitted PDU(s). At point 7, at a predetermined time interval, the Node B responds with a permission signal on the E-AGCH (with an E-AGCH message) using the UE-ID the UE sent in the uplink. The UE-ID is masked on the CRC to generate a UE-specific CRC that the UE knowing the same is able to receive. The E-AGCH message may also carry information on the data rate with which the UE may continue the data transmission.

At point 8, if the UE receives an E-AGCH message (the permission signal) with a specific timing (e.g., a predetermined time period) including the UE-ID, the UE may continue transmitting (e.g., with a new data rate), as described herein. However, at point 9, if the UE did not receive the E-AGCH message with the UE-ID during the specific timing (e.g., the predetermined time period), the UE stops transmitting and considers the procedure as failed, waits for a randomized time interval, and retries. Thus, there is a time window (including multiple possible time instants) in which the Node B sends the E-AGCH a message indicating that the UE may continue to transmit. The time window is terminated by the "predetermined time interval," and if no E-AGCH was received during that time window, then the UE will stop transmitting and considers the procedure as failed. Additionally, if the UE did receive the permission signal and does not receive an updated permission signal periodically within the predetermined time period, then the UE stops transmitting and considers the procedure as failed, waits for a randomized time interval, and retries.

It is noted that according to various embodiments of the present invention that the collision detection that would happen during the actual data transmission would not introduce additional delays. The use of the random element of the access slot and signature selection can drastically diminish the probability of a collision actually happening. If, however, the collision takes place, it would need to be detected and resolved, as described herein. If the collision detection is done before the actual transmission is allowed to start, it may unnecessarily delay successful data transmissions.

Figure 2:
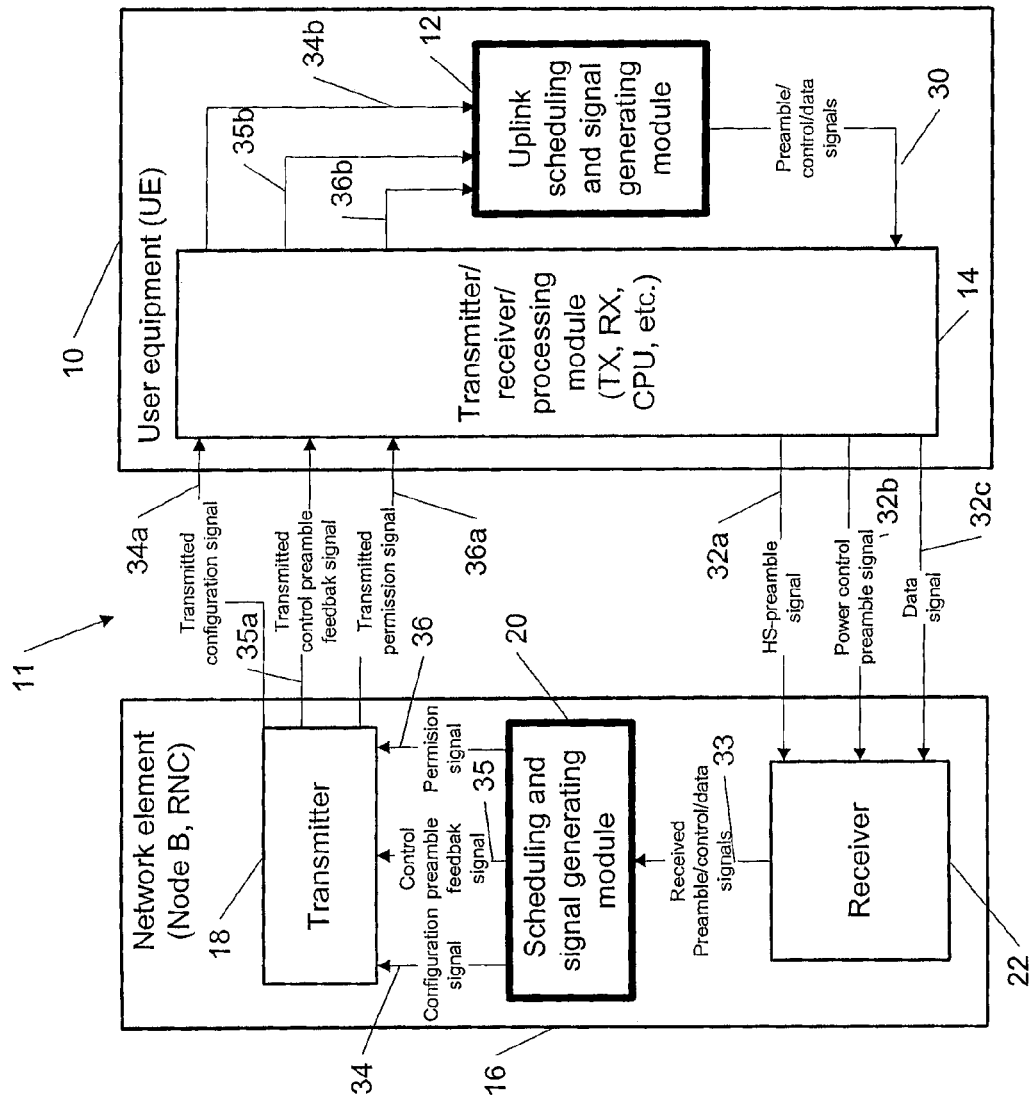
FIG. 2 illustrates a block diagram demonstrating collision detection for a random access procedure for an uplink data channel in a wireless communication system constructed according to an embodiment.

Turning now to FIG. 2, illustrated is a block diagram demonstrating collision detection for a random access procedure for an uplink data channel in a communication system (e.g., a wireless/mobile communication system) 11 constructed according to an embodiment. A communication device (e.g., UE) 10 in the wireless/mobile communication system 11 includes an uplink scheduling and signal generating module 12 and a transmitter/receiver/processing module 14. The uplink scheduling and signal generating module 12 can be generally viewed as a managing means and a structural equivalence or an equivalent structure thereof. Similarly, the transmitter/receiver/processing module 14 can be generally viewed as a transmitting and receiving means and a structural equivalence (or equivalent structure) thereof. The UE 10 can be a communication device such as a wireless communication device, a portable device, a mobile communication device, a mobile phone, etc. In the example of FIG. 2, a network element 16 (e.g., a Node B or other portions of the communication system 11) can include a transmitter 18, a scheduling and signal generating module 20 and a receiver 22.

According to an embodiment, the scheduling and signal generating module 20 in the network element 16 can provide a configuration signal 34, a control preamble feedback signal 35 and a permission signal 36 (akin to point 7 in FIG. 1 as described hereinabove) or, if necessary, an updated permission signal. The aforementioned signals 34, 35, 36 are then forwarded using corresponding signals 34a, 35a, 36a via the transmitter 18 of the network element 16 to the transmitter/receiver/processing module 14 of the UE 10. The transmitter/receiver/processing module 14 thereafter forwards corresponding signals 34b, 35b, 36b to the uplink scheduling and signal generating module 12. The uplink scheduling and signal generating module 12 then provides preamble/control/data signals 30, which are in turn transmitted by the transmitter/receiver/processing module 14 to the network element 16 in the uplink as an HS-preamble signal 32a, a power control preamble signal (which may carry the specific UE-ID) 32b and a data signal 32c (akin to points 2, 4, and 6 (or 8) illustrated in FIG. 1 as described hereinabove). The receiver 22 of the network element 16 forwards the HS-preamble signal 32a, the power control preamble signal 32b and the data signal 32c to the scheduling and signal generating module 20 in the form of a received preamble/control/data signal 33.

According to an embodiment, the uplink scheduling and signal generating module 12 (the same is applicable to the scheduling and signal generating module 20) can be implemented as software or a hardware block or a combination thereof. Furthermore, the uplink scheduling and signal generating module 12 (as well as the scheduling and signal generating module 20 and other modules of the UE 10 and of the network element 16) can be implemented as a separate module or can be combined with any other standard module/block, or it can be split into several blocks according to their functionality. The transmitter/receiver/processing module 14 can be implemented in a plurality of ways and typically can include a transmitter, a receiver, a central processing unit, etc. The transmitter/receiver/processing module 14 provides an effective communication of the uplink scheduling and signal generating module 12 with the network element 16 as described herein. All or selected blocks and modules of the user equipment 10 can be implemented using an integrated circuit, and all or selected blocks of the network element 16 can be implemented using an integrated circuit as well.

It is noted that the uplink scheduling and signal generating module 12 can generally be managing means or a structural equivalence (or equivalent structure) thereof. Also, the transmitter/receiver/processing module 14 can generally be a transmitting and receiving means or a structural equivalence (or equivalent structure) thereof. It is noted that the network element 16, for the purposes of understanding of various embodiments of the present invention, can be broadly interpreted such that the network element 16 can include features attributed to both the Node B and the Radio Network Controller (RNC). Specifically, the scheduling and signal generating module 20 can be located in the RNC (then the signaling from the RNC is forwarded to the user equipment by the Node B) or in the Node B, whereas the receiver 22 is located in the Node B.

Turning now to FIG. 3, illustrated is a flow chart demonstrating collision detection for a random access procedure for an uplink data channel in a wireless communication system (e.g., a wireless/mobile communication system) constructed according to an embodiment. The flow chart of FIG. 3 only represents one possible scenario among others. The order of steps shown in FIG. 3 is not absolutely required, so generally, the various steps can be performed in a different order. In a method according to an embodiment, in a first step 50, the HS-RACH configuration(s) with channelisation codes and signatures are provided to the UE by a Network Element (NE) such as a Node B on a Broadcast Channel (BCH). In step 52, the UE selects the random access slot and the random signature for the HS-preamble and sends the HS-preamble with the HS-RACH request to the network element. In step 54, the network element responds with the acquisition message or indication with a possible channel assignment message (e.g., see the configuration signal 34 in FIG. 2) using the selected signature and the random access slot (e.g., using the AICH). In step 56, the UE starts to transmit a power control preamble including the UE-ID to which, in a next step 58, the network element responds by starting to transmit power control feedback, maintaining the uplink transmit power at a desired level, as well as transmitting Hybrid Automatic Request (HARQ) acknowledgement signals (e.g., using F-DPCH and E-HICH, respectively).

In step 60, the UE starts data transmission on, for instance, the E-DPCCH/E-DPDCH channel(s) reserved for the HS-RACH. In step 70, if the network element did not detect a collision and receives the UE-ID, the process proceeds with step 72. In step 72, the network element sends a permission signal during a predetermined time interval or, in necessary, an updated permission signal including the UE-ID on, for instance, the E-AGCH. A new data rate can also be provided. In step 70, if the network element did detect a collision, the procedure ends at step 74.

A process for collision detection with a random access procedure, constructed according to an embodiment, can be summarized as follows. First, a PRACH/AICH random access acquisition procedure is executed, after which a UE starts sending data via the E-DCH. The UE embeds its ID in the MAC header sent with the E-DCH. If the UE does not receive its ID back from the network element within the predetermined time interval, it considers that there was a communication failure and stops transmitting.

In accordance with aspects of the present invention, a method, an apparatus, a communication system, and software are provided for collision detection for a random access procedure for an uplink data channel such as an enhanced dedicated channel (e.g., E-DPCCH and/or an E-DPDCH utilized by a communication device for communicating with a network element such as Node B, in a communication system such as a wireless/mobile communication system.

A communication system, a network element and an apparatus such as a communication device have thus been described wherein the apparatus communicates with the network element utilizing an uplink data channel (e.g., an enhanced dedicated channel). In an embodiment, the apparatus includes a module (e.g., a transmitter/receiver/processing module) configured to transmit a data transmission on the uplink data channel (e.g., at a data rate provided by a permission signal) and an uplink scheduling and signal generating module configured to select random access parameters for a random access procedure and schedule the data transmission using the random access parameters for the random access procedure. The uplink scheduling and signal generating module is also configured to interrupt the data transmission after a predetermined time interval if the apparatus does not receive a permission signal from a network element during the predetermined time interval. The permission signal may be received over an absolute grant channel, an enhanced dedicated channel, a hybrid automatic repeat request acknowledgement indicator channel or on a high-speed shared control channel. The uplink scheduling and signal generating module is further configured to interrupt the data transmission after receiving a stop signal from the network element such as when a collision is detected.

The uplink scheduling and signal generating module is further configured to transmit an apparatus identification (e.g., a UE-ID when the apparatus is user equipment) to the network element for the random access procedure. The apparatus identification may be transmitted in accordance with a power control preamble over a dedicated physical control channel, an enhanced dedicated physical control channel, or on a MAC header over the enhanced dedicated physical data channel. The uplink scheduling and signal generating module is further configured to receive the permission signal during the predetermined time interval and interrupt the data transmission if the apparatus does not receive an updated permission signal from the network element during the predetermined time interval.

The uplink scheduling and signal generating module is configured to select the random access parameters by receiving a configuration signal including a channelisation code and a signature for the random access procedure over a broadcast channel, selecting a random access slot and a random signature for the random access procedure using the configuration signal, and transmitting a preamble signal having the random access slot and the random signature to the network element. In accordance therewith, the uplink scheduling and signal generating module is further configured to receive an acquisition message over an acquisition indicator channel.

In another aspect, an apparatus includes means for transmitting a data transmission on an uplink data channel, means for selecting random access parameters for a random access procedure, means for scheduling the data transmission using the random access parameters for the random access procedure and means for interrupting the data transmission after a predetermined time interval if the apparatus does not receive a permission signal from a network element during the predetermined time interval. The apparatus also includes means for interrupting the data transmission after receiving a stop signal from the network element. The apparatus further includes means for transmitting an apparatus identification to the network element for the random access procedure. Additionally, the apparatus includes means for receiving the permission signal during the predetermined time interval and means for interrupting the data transmission if the apparatus does not receive an updated permission signal from the network element during the predetermined time interval.

The apparatus further includes means for receiving a configuration signal including a channelisation code and a signature for the random access procedure, means for selecting a random access slot and a random signature for the random access procedure using the configuration signal, and means for transmitting a preamble signal having the random access slot and the random signature to the network element. The apparatus still further includes means for receiving an acquisition message over an acquisition indicator channel.

In another aspect, a communication system includes a network element (e.g., a Node B) having a scheduling and signal generating module configured to provide a configuration signal and a transmitter configured to transmit the configuration signal. The communication system also includes user equipment having a module (e.g., a transmitter/receiver/processing module) configured to transmit a data transmission on an uplink data channel to the network element and an uplink scheduling and signal generating module configured to select random access parameters for a random access procedure in accordance with the configuration signal and schedule the data transmission using the random access parameters for the random access procedure. The uplink scheduling and signal generating module is also configured to interrupt the data transmission after a predetermined time interval if the user equipment does not receive a permission signal from the network element during the predetermined time interval.

The uplink scheduling and signal generating module is further configured to interrupt the data transmission after receiving a stop signal from the network element. The uplink scheduling and signal generating module is further configured to transmit a user equipment identification to the network element for the random access procedure. The uplink scheduling signal generating module is further configured to receive the permission signal during the predetermined time interval and interrupt the data transmission if the apparatus does not receive an updated permission signal from the network element during the predetermined time interval.

The uplink scheduling and signal generating module is further configured to select the random access parameters by receiving the configuration signal including a channelisation code and a signature for the random access procedure, selecting a random access slot and a random signature for the random access procedure using the configuration signal and transmitting a preamble signal having the random access slot and the random signature to the network element. The uplink scheduling and signal generating module is further configured to receive an acquisition message over an acquisition indicator channel.

In another aspect, a method includes selecting random access parameters for a random access procedure, transmitting a communication device identification to a network element (e.g., in accordance with a MAC header on an enhanced dedicated physical data channel) for the random access procedure, and transmitting a data transmission (e.g., at a data rate provided by a permission signal) on an uplink data channel (e.g., an enhanced dedicated channel) by the communication device to the network element using the random access parameters for the random access procedure. The method also includes interrupting the data transmission after a predetermined time interval if the communication device does not receive a permission signal from the network element during the predetermined time interval. The permission signal may be received over an absolute grant channel, an enhanced dedicated channel, a hybrid automatic repeat request acknowledgement indicator channel or on a high-speed shared control channel. The method also includes interrupting the data transmission after receiving a stop signal from the network element (e.g., in the event of a collision).

The method also includes receiving the permission signal during the predetermined time interval, and interrupting the data transmission if the communication device does not receive an updated permission signal from the network element during the predetermined time interval. The act of selecting the random access parameters further includes receiving a configuration signal including a channelisation code and a signature for the random access procedure at the communication device over a broadcast channel, selecting a random access slot and a random signature for the random access procedure using the configuration signal, and transmitting a preamble signal having the random access slot and the random signature from the communication device to the network element. The method may also include receiving an acquisition message at the communication device over an acquisition indicator channel.

As described above, the exemplary embodiment provides both a method and corresponding equipment consisting of various modules providing functionality for performing the steps of the method. The modules may be implemented as hardware (including an integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

According to another aspect, a computer program product includes a computer readable storage structure embodying computer program code thereon for execution by a computer processor with the computer program code, wherein the computer program code includes instructions for performing the system and method described herein, indicated as being performed by any component or a combination of components of the apparatus (e.g., communication device) or network element.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to provide collision detection and resolution for a random access procedure for an uplink data channel in a wireless communication system including a network element and a wireless communication device as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising at least one processor; and at least one memory including computer program code, the at least one memory and the computer program code configured to, with the at least one processor, cause the apparatus to perform at least the following:

selecting random access parameters for a random access procedure;

scheduling a data transmission from a communication device on an uplink data channel using said random access parameters for said random access procedure;

in response to the scheduling, receiving from a network element a configuration signal including an acquisition message;

in response to the acquisition message, starting the data transmission on the uplink data channel;

interrupting said data transmission after a predetermined time interval in response to said apparatus not receiving from said network element during said predetermined time interval a permission signal indicating permission to continue said random access procedure, said permission signal comprising an identification of the communication device from said network element during said predetermined time interval, and said permission signal comprising an indication of a data rate to transmit the data transmission, wherein said permission signal is configured to be received over an absolute grant channel, an enhanced dedicated channel, a hybrid automatic repeat request acknowledgement indicator channel or on a high-speed shared control channel; and rescheduling said data transmission following a randomized time interval in response to interrupting said data transmission.

2. The apparatus as recited in claim 1 wherein the permission signal is based on at least a collision not being detected by said network element during the predetermined time interval.

3. The apparatus as recited in claim 1 wherein the at least one memory and the computer program code are further configured to cause the apparatus to in response to the scheduling, to perform transmitting a power control preamble of a predefined length to said network element to maintain an uplink transmit power at a desired level for said data transmission on the uplink, wherein the power control preamble comprises said identification of the communication device.

4. The apparatus as recited in claim 1, wherein the at least one memory and the computer program code are further configured to cause the apparatus to perform transmitting an identification of the communication device to said network element for said random access procedure, wherein said identification is transmitted in accordance with a media access control header on an enhanced dedicated physical data channel.

5. The apparatus as recited in claim 1 wherein the permission signal is received during said predetermined time interval, and wherein the at least one memory and the computer program code are further configured to cause the apparatus to perform interrupting said data transmission in response to said apparatus not receiving a subsequent permission signal from said network element during said predetermined time interval.

6. The apparatus as recited in claim 1 where the permission signal comprises an indication of a new data rate and wherein the at least one memory and the computer program code are further configured to cause the apparatus to continue transmitting said data transmission at the new data rate provided by said permission signal.

7. The apparatus as recited in claim 1 wherein said permission signal comprises an identification of the communication device masked with a cyclic redundancy check that is generated using the identification of the communication device.

8. The apparatus as recited in claim 1 wherein the configuration signal further comprises a channelisation code and a signature for said random access procedure, and wherein the at least one memory and the computer program code are further configured to cause the apparatus to, when selecting said random access parameters, perform:
   selecting a random access slot and a random signature for said random access procedure using said configuration signal; and
   transmitting a preamble signal having said random access slot and said random signature to said network element, wherein the data transmission on the uplink data channel is started after the preamble is transmitted.

9. The apparatus as recited in claim 1 wherein the at least one memory and the computer program code are further configured to cause the apparatus to perform receiving the configuration signal including the acquisition message over an acquisition indicator channel.

10. The apparatus as recited in claim 1 wherein said configuration signal is received over a broadcast channel.

11. The apparatus as recited in claim 1 wherein said uplink data channel is an enhanced dedicated channel.

12. The apparatus as recited in claim 1 wherein said uplink scheduling and signal generating module is formed as an integrated circuit.

13. The apparatus as recited in claim 1 where the predetermined time interval is user-class dependent.

14. An apparatus, comprising:
    means for selecting random access parameters for a random access procedure;
    means for scheduling a data transmission from a communication device on an uplink data channel using said random access parameters for said random access procedure;
    means, in response to the scheduling, for receiving from a network element a configuration signal including an acquisition message;
    means, in response to the acquisition message, for starting the data transmission on the uplink data channel;
    means for interrupting said data transmission after a predetermined time interval in response to said apparatus not receiving from said network element during said predetermined time interval a permission signal indicating permission to continue said random access procedure, said permission signal comprising an identification of the communication device from said network element during said predetermined time interval, and said permission signal comprising an indication of a data rate to transmit the data transmission, wherein said permission signal is configured to be received over an absolute grant channel, an enhanced dedicated channel, a hybrid automatic repeat request acknowledgement indicator channel or on a high-speed shared control channel; and
    means for rescheduling said data transmission following a randomized time interval in response to interrupting said data transmission.

15. The apparatus as recited in claim 14 further comprising means for transmitting an identification of the communication device to said network element for said random access procedure.

16. The apparatus as recited in claim 14, wherein the configuration signal further comprises a channelisation code and a signature for said random access procedure, and further comprising:
    means for selecting a random access slot and a random signature for said random access procedure using said configuration signal;
    means for transmitting a preamble signal having said random access slot and said random signature to said network element, wherein the data transmission on the uplink data channel is started after the preamble is transmitted; and
    means for receiving said configuration signal including the acquisition message over an acquisition indicator channel.

17. The apparatus as recited in claim 14 where the predetermined time interval is user-class dependent.

18. A non-transitory computer readable medium tangibly encoded with a computer program executable by a processor to perform actions comprising:
    selecting random access parameters for a random access procedure;
    scheduling a data transmission on an uplink data channel from a communication device to a network element using said random access parameters for said random access procedure;
    in response to the scheduling, receiving from said network element a configuration signal including an acquisition message;
    in response to the acquisition message, starting the data transmission on the uplink data channel;
    interrupting said data transmission after a predetermined time interval in response to said communication device not receiving from said network element during said predetermined time interval a permission signal indicating permission to continue said random access procedure, said permission signal comprising an identification of the communication device from said network element during said predetermined time interval, and said permission signal comprising an indication of a data rate to transmit the data transmission, wherein said permission signal is configured to be received over an absolute grant channel, an enhanced dedicated channel, a hybrid automatic repeat request acknowledgement indicator channel or on a high-speed shared control channel; and
    in response to interrupting said data transmission, rescheduling said data transmission following a randomized time interval.

19. The computer readable medium as recited in claim 18 where the actions further comprise transmitting a communication device identification to said network element for said random access procedure.

20. The computer readable medium as recited in claim 18 where the permission signal comprises an indication of a new data rate and where the actions further comprise transmitting said data transmission at the new data rate provided by said permission signal.

21. The computer readable medium as recited in claim 18 wherein the configuration signal further comprises a channelisation code and a signature for said random access procedure, and where selecting said random access comprises:

selecting a random access slot and a random signature for said random access procedure using said configuration signal, and transmitting a preamble signal having said random access slot and said random signature from said communication device to said network element, wherein the data transmission on the uplink data channel is started after the preamble is transmitted.

22. The computer readable medium as recited in claim 18 where the configuration signal including the acquisition message is received at said communication device over an acquisition indicator channel.

23. The computer readable medium as recited in claim 18 where the predetermined time interval is user-class dependent.

24. A method, comprising:

selecting random access parameters for a random access procedure;

scheduling a data transmission on an uplink data channel from a communication device to a network element using said random access parameters for said random access procedure;

in response to the scheduling, receiving from said network element a configuration signal including an acquisition message;

in response to the acquisition message, starting the data transmission on the uplink data channel;

interrupting said data transmission after a predetermined time interval in response to said communication device not receiving from said network element during said predetermined time interval a permission signal indicating permission to continue said random access procedure, said permission signal comprising an identification of the communication device from said network element during said predetermined time interval, and said permission signal comprising an indication of a data rate to transmit the data transmission, wherein said permission signal is configured to be received over an absolute grant channel, an enhanced dedicated channel, a hybrid automatic repeat request acknowledgement indicator channel or on a high-speed shared control channel; and in response to interrupting said data transmission, rescheduling said data transmission following a randomized time interval.

25. The method as recited in claim 24 wherein said interrupting includes interrupting said data transmission after receiving a stop signal from said network element.

26. The method as recited in claim 24 further comprising transmitting a communication device identification to said network element for said random access procedure.

27. The method as recited in claim 26 wherein said communication device identification is transmitted in accordance with a media access control header on an enhanced dedicated physical data channel.

28. The method as recited in claim 24 wherein said permission signal is received during said predetermined time interval, further comprising interrupting said data transmission in response to said communication device not receiving a subsequent permission signal from said network element during said predetermined time interval.

29. The method as recited in claim 24 where the permission signal comprises an indication of a new data rate and the method further comprises transmitting said data transmission at the new data rate provided by said permission signal.

30. The method as recited in claim 24 wherein said permission signal is received over an absolute grant channel, an enhanced dedicated channel, a hybrid automatic repeat request acknowledgement indicator channel or on a high-speed shared control channel.

31. The method as recited in claim 24 wherein said selecting said random access parameters further includes:

receiving a configuration signal including a channelisation code and a signature for said random access procedure at said communication device;

selecting a random access slot and a random signature for said random access procedure using said configuration signal; and transmitting a preamble signal having said random access slot and said random signature from said communication device to said network element.

32. The method as recited in claim 31 further comprising receiving an acquisition message at said communication device over an acquisition indicator channel.

33. The method as recited in claim 31 wherein said configuration signal is received over a broadcast channel.

34. The method as recited in claim 24 wherein said uplink data channel is an enhanced dedicated channel.

35. The method as recited in claim 24 where the predetermined time interval is user-class dependent.

* * * * *